(12) United States Patent
Lindström et al.

(10) Patent No.: US 9,137,765 B2
(45) Date of Patent: Sep. 15, 2015

(54) METHODS AND ARRANGEMENTS IN RADIO COMMUNICATION SYSTEMS

(75) Inventors: Magnus Lindström, Spånga (SE); Lisa Boström, Solna (SE); Janne Peisa, Espoo (FI); Mats Sågfors, Kyrkslätt (FI); Henning Wiemann, Aachen (DE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 706 days.

(21) Appl. No.: 13/025,893

(22) Filed: Feb. 11, 2011

(65) Prior Publication Data

US 2011/0200032 A1     Aug. 18, 2011

Related U.S. Application Data

(63) Continuation of application No. PCT/EP2010/070257, filed on Dec. 20, 2010.

(60) Provisional application No. 61/304,656, filed on Feb. 15, 2010.

(51) Int. Cl.
*H04J 3/06*     (2006.01)
*H04W 56/00*     (2009.01)

(52) U.S. Cl.
CPC ...... *H04W 56/0005* (2013.01); *H04W 56/0045* (2013.01)

(58) Field of Classification Search
CPC .......................... H04W 56/00; H04W 56/0005
USPC .................................. 370/280, 336, 329, 350
See application file for complete search history.

(56) References Cited

U.S. PATENT DOCUMENTS

| 5,228,029 | A | * | 7/1993 | Kotzin | 370/331 |
| 7,979,090 | B2 | * | 7/2011 | Alm et al. | 455/562.1 |
| 8,634,313 | B2 | * | 1/2014 | Tenny et al. | 370/252 |
| 8,902,811 | B2 | | 12/2014 | Baldemair et al. | |
| 2001/0036200 | A1 | * | 11/2001 | Nelson et al. | 370/503 |

(Continued)

FOREIGN PATENT DOCUMENTS

| CN | 101646234 A | 2/2010 |
| EP | 2230870 A1 | 9/2010 |

(Continued)

OTHER PUBLICATIONS

International Search Report mailed Mar. 15, 2011, in corresponding International Application No. PCT/EP2010/070257.

(Continued)

*Primary Examiner* — Parth Patel
(74) *Attorney, Agent, or Firm* — Patent Portfolio Builders PLLC

(57) ABSTRACT

Methods and arrangements for adjusting timing of transmissions in a radio communication system in which aggregation of component carriers is employed are disclosed. A base station sends a first TA command applicable to a first component carrier to a user equipment. A need to maintain different uplink transmission timing for the first user equipment component carrier and second uplink component carrier is detected by the base station. The base station then sends a second TA command based on the detected need to maintain different uplink transmission timing. The second TA command is applicable to uplink transmissions on the first component carrier and/or the second component carrier. The user equipment adjusts uplink transmissions on the first component carrier and/or the second uplink component carrier based on the second timing advance command.

48 Claims, 12 Drawing Sheets

(56) References Cited

U.S. PATENT DOCUMENTS

| | | |
|---|---|---|
| 2004/0114556 A1* | 6/2004 | Miller et al. ............... 370/335 |
| 2008/0014960 A1* | 1/2008 | Chou ..................... 455/456.1 |
| 2008/0085715 A1* | 4/2008 | Alm et al. ................ 455/450 |
| 2008/0248796 A1* | 10/2008 | Oh et al. .................. 455/423 |
| 2008/0285670 A1* | 11/2008 | Walton et al. ............ 375/260 |
| 2009/0029715 A1* | 1/2009 | Burchardt ............. 455/456.1 |
| 2010/0020786 A1* | 1/2010 | Futaki et al. ............. 370/350 |
| 2010/0238908 A1* | 9/2010 | Wu .......................... 370/336 |
| 2011/0044188 A1* | 2/2011 | Luo et al. ................. 370/252 |
| 2011/0051633 A1* | 3/2011 | Pan et al. ................. 370/280 |
| 2011/0170535 A1* | 7/2011 | Wang et al. .............. 370/350 |
| 2012/0113939 A1* | 5/2012 | Kim et al. ................ 370/329 |
| 2012/0182986 A1* | 7/2012 | Sebire ...................... 370/343 |

FOREIGN PATENT DOCUMENTS

| | | | |
|---|---|---|---|
| JP | 2012-531121 A | 12/2012 | |
| JP | 2012-531807 A | 12/2014 | |
| WO | WO2009132580 A1 * | 4/2009 | ............ H04W 56/00 |
| WO | 2010/151213 A1 | 12/2010 | |

OTHER PUBLICATIONS

Written Opinion of the ISR mailed Mar. 15, 2011, in corresponding International Application No. PCT/EP2010/070257.

Qualcomm Incorporated: "Supporting Multiple Timing Advance Groups", 3GPP Draft; R2-100423 Supporting Multiple Timing Advance Groups, 3rd Generation Partnership Project (3GPP), Mobile Competence Centre; 650, Route Des Lucioles; F-06921 Sophia-Antipolis Cedex; France, vol. RAN WG2, No. Valencia, Spain; Jan. 18, 2010, Jan. 12, 2010, XP050421077.

LG Electronics Inc: "RAN2 Impacts by Multiple Timing Advance", 3GPP Draft; R2-100332 LTE CA Multiple Timing Advance, 3rd Generation Partnership Project (3GPP), Mobile Competence Centre; 650, Route Des Lucioles; F-06921 Sophia-Antipolis Cedex; France, vol. RAN WG2, No. Valencia, Spain; Jan. 18, 2010, Jan. 12, 2010, XP050421031.

Nokia Siemens Networks et al: "Carrier Aggregation and Timing Advance", 3GPP Draft; R2-095519 Carrier Aggregation & Timing Advance, 3rd Generation Partnership Project (3GPP), Mobile Competence Centre; 650, Route Des Lucioles; F-06921 Sophia-Antipolis Cedex; France, No. Miyazaki; Oct. 12, 2009, XP050390061.

First Office Action and Search Report in corresponding Chinese Application No. 201080063924.6 issued Sep. 2, 2014.

Notice of Allowance in corresponding Japanese Application No. 2012-552282 issued Feb. 6, 2015.

* cited by examiner

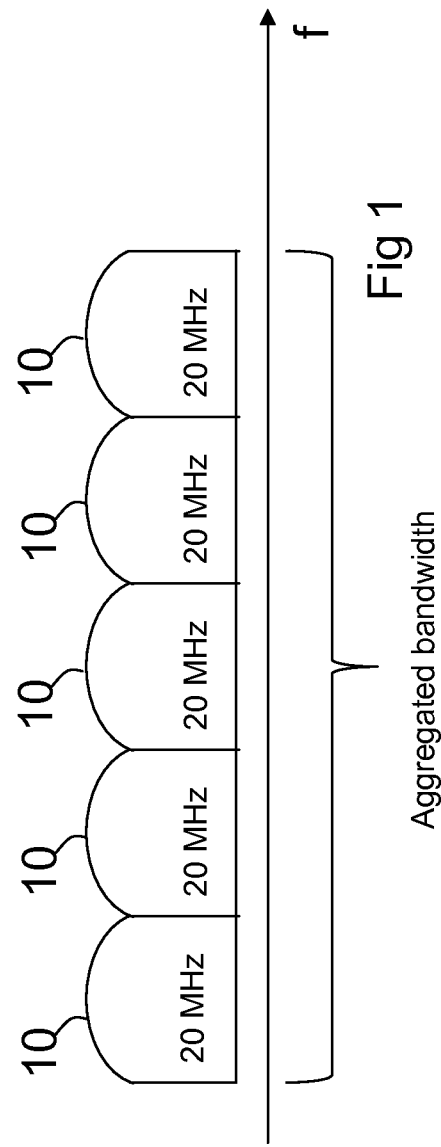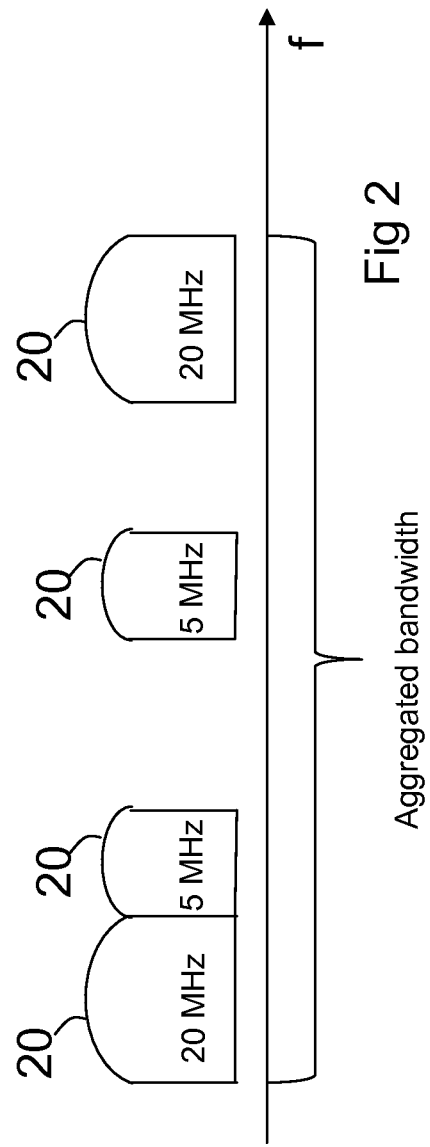

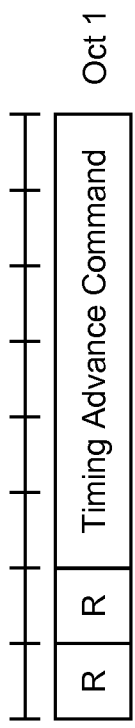
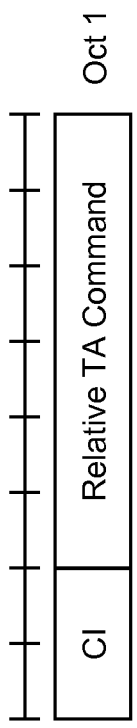
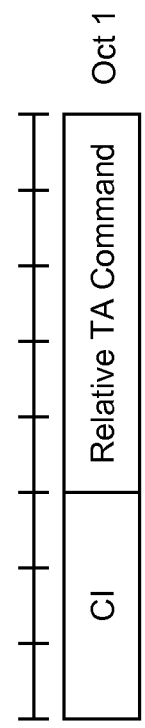
Fig 8
Fig 9

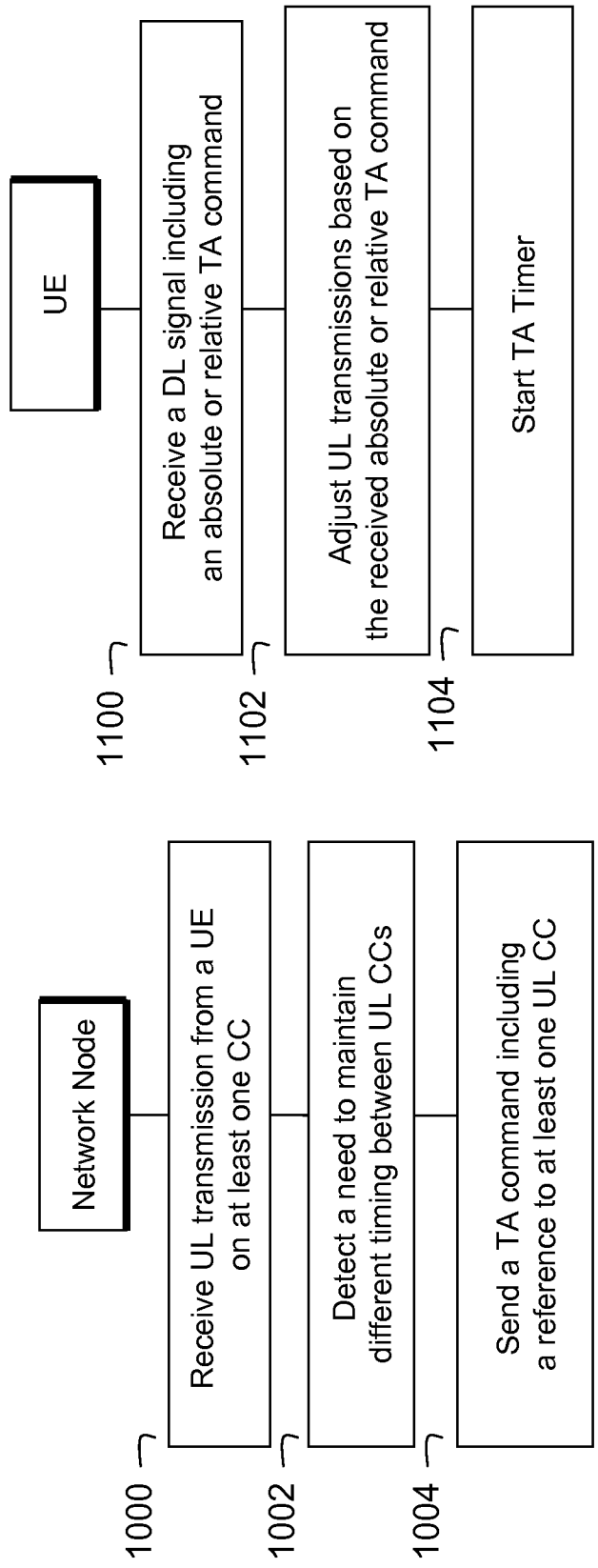

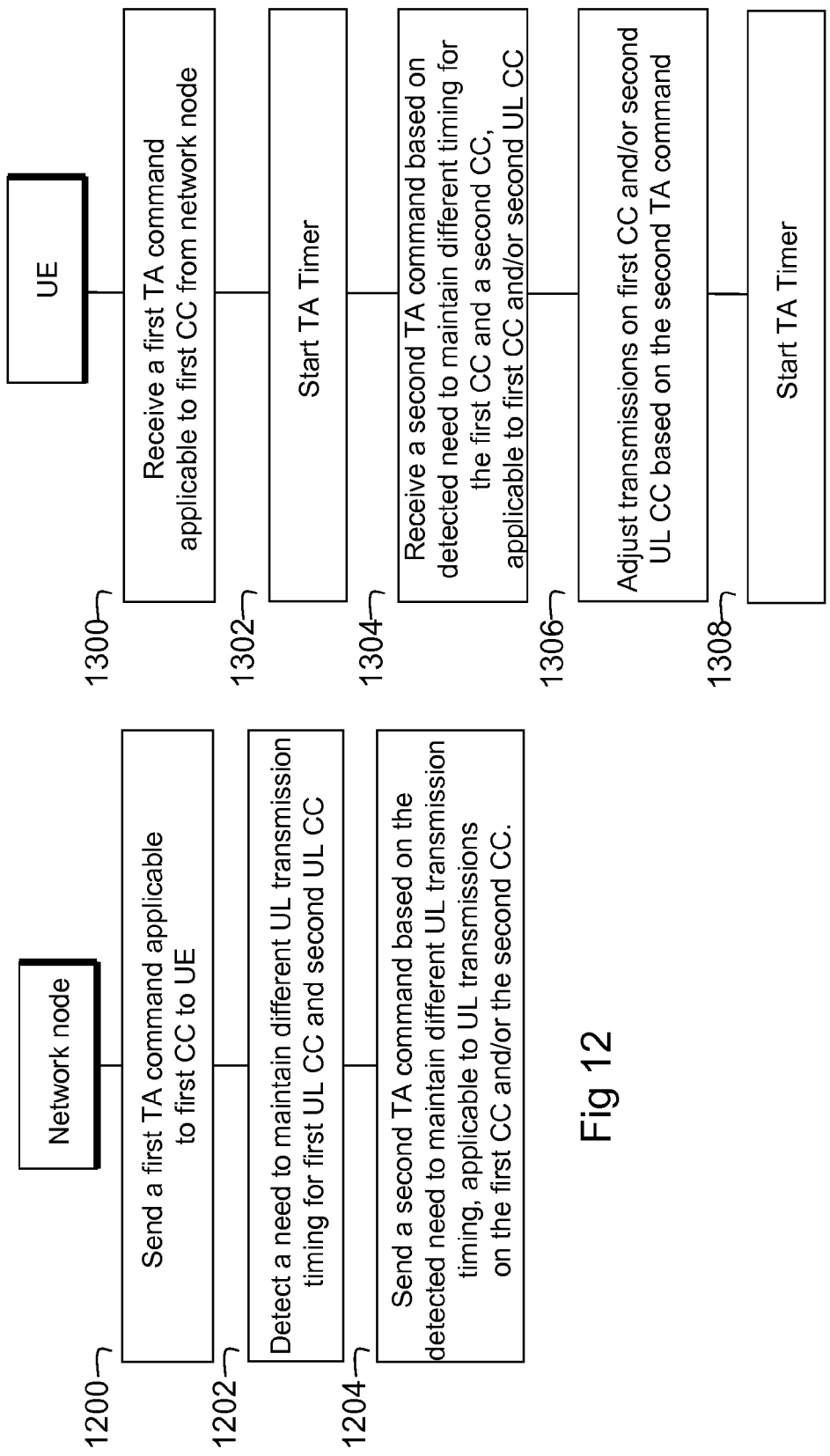

METHODS AND ARRANGEMENTS IN RADIO COMMUNICATION SYSTEMS

TECHNICAL FIELD

The present invention relates to arrangements and methods in radio communication systems, and more particularly, to adjusting timing of transmissions in radio communication system in which aggregation of component carriers is applied.

At its inception radio telephony was designed, and used for, voice communications. As the consumer electronics industry continued to mature, and the capabilities of processors increased, more devices became available to use wireless transfer of data and more applications became available that operate based on such transferred data. Of particular note are the Internet and local area networks (LANs). These two innovations allowed multiple users and multiple devices to communicate and exchange data between different devices and device types. With the advent of these devices and capabilities, users (both business and residential) found the need to transmit data, as well as voice, from mobile locations.

The infrastructure and networks which support this voice and data transfer have likewise evolved. Limited data applications, such as text messaging, were introduced into the so-called "2 G" systems, such as the Global System for Mobile (GSM) communications. Packet data over radio communication systems became more usable in GSM with the addition of the General Packet Radio Services (GPRS). 3 G systems and, then, even higher bandwidth radio communications introduced by Universal Terrestrial Radio Access (UTRA) standards made applications like surfing the web more easily accessible to millions of users.

Even as new network designs are rolled out by network manufacturers, future systems which provide greater data throughputs to end user devices are under discussion and development. For example, the so-called 3 GPP Long Term Evolution (LTE) standardization project is intended to provide a technical basis for radio communications in the decades to come. Among other things of note with regard to LTE systems is that they will provide for downlink (DL) communications (i.e., the transmission direction from the network to the mobile terminal) using orthogonal frequency division multiplexing (OFDM) as a transmission format and will provide for uplink communications (i.e., the transmission direction from the mobile terminal to the network) using single carrier frequency division multiple access (FDMA).

In mobile communication systems like LTE it is necessary to adjust the timing of the uplink (UL) transmissions, i.e., transmissions in the direction from a terminal or user equipment (UE) toward the radio base station or network, so that they are received synchronously at the base station (e.g., eNodeB). Since the signals experience different propagation delays (both in the uplink and in the downlink) the actual transmission time must differ among UEs to achieve synchronous reception. In LTE this timing adjustment is achieved by a so-called time alignment procedure wherein, for each UE, the eNodeB measures the actual uplink timing and determines the time offset by which the UE should advance or delay its transmission. The eNodeB sends this value in a timing advance (TA) command to the corresponding UE.

The timing advance command leads to the desired time alignment as long as the propagation delay between the UE and the eNodeB does not change. Clearly, such a static condition cannot be guaranteed in a mobile communication system since the propagation conditions change as the UE moves, and the uplink timing must therefore be updated when a time-drift occurs. Without such adjustments, the received signal could leak over to other received frames or subframes used e.g., by other UEs, resulting in excessive interference between the users.

Therefore, the eNodeB repeatedly re-evaluates whether the received signal is still synchronized and sends timing adjustments regularly. To prevent UEs from sending data while not being synchronized, the eNodeB configures a time alignment timer in the UE. The UE starts or restarts the time alignment timer upon reception of the timing advance command. While the time alignment timer is running, the UE may assume that its uplink is still synchronized with the eNodeB and it may perform uplink transmissions. When the timer expires, the UE assumes that the uplink synchronization is lost. In this case the UE performs a random access procedure in order to obtain synchronization prior to any data transmission. During the random access procedure the eNodeB determines a suitable initial TA value based on the random access preamble sent by the UE.

The 3GPP LTE standard currently supports bandwidths up to 20 MHz. However, in order to meet the upcoming IMT-Advanced requirements, 3GPP has initiated work on LTE-Advanced. One of the parts of LTE-Advanced is to support bandwidths larger than 20 MHz. This will be achieved using a concept called "carrier aggregation", where multiple carrier components, each of which may be up to 20 MHz wide, are aggregated together.

Carrier aggregation implies that a future-release terminal can receive and send on multiple component carriers, where the component carriers have, or at least have the possibility to have, the same structure as a legacy carrier. An example of carrier aggregation is illustrated in FIG. 1, wherein five bands of 20 MHz each are aggregated together to use for transmission from, or reception to, a single LTE UE.

Carriers can be aggregated contiguously as illustrated in FIG. 1, or they may be aggregated from discontinuous portions in the frequency domain, such that e.g. parts of the aggregated carriers may be contiguous, and other aggregated carriers appear somewhere else in the spectrum, as schematically illustrated in FIG. 2.

With the carrier aggregation concept, it may be possible, e.g., in radio communications systems which are designed in accordance with future releases to support, among other things: higher bit-rates, farming of non-contiguous spectrum to provide high bit-rates and better capacity in cases when an operator lacks contiguous spectrum, and fast and efficient load balancing between carriers. It should be noted that carrier aggregation is a UE-centric concept, in that one UE may be configured to use, e.g., the two left-most carriers illustrated in FIG. 2, while another UE is configured to use only a single carrier, and a third UE may be configured to use all of the carriers depicted in FIG. 2. Thus, a UE can then be configured with so called Component Carriers (CCs), each corresponding to a carrier of a specific frequency (within the same frequency band or different frequency bands). Multiple UL and DL CCs could be configured independently of each other, meaning that they are not necessarily configured as UL/DL pairs as in previous releases of the 3GPP LTE standard. Asymmetric configurations are possible, where the number of UL CCs differ from the number of DL CCs.

Considering now the impact of carrier aggregation on timing alignment, note that in certain deployment scenarios the propagation delays will differ among aggregated carriers. This means that a UE must transmit its uplink signals at different time instances to ensure that they are received simultaneously at the eNodeB. Also the downlink propagation delays may differ among DL CCs so that the UE also needs to adjust its receiver chains accordingly.

One way to address the different propagation delays among CCs is to perform the time alignment procedure described above independently for each uplink component carrier or each group of component carriers. An example of such a solution implies that the UE maintains multiple TA values and time alignment timers valid for each UL carrier or group of UL carriers and it further requires that the eNodeB provides TA commands regularly for each UL CC or group of UL CCs. This approach is a straightforward extension of the single-carrier concept, where each UL carrier is treated independently with its own time-alignment handling, processes and timers.

However, this solution suffers from certain drawbacks, among them that a greater complexity is required both in the UE and eNodeB to maintain multiple time-alignment instances and multiple timers. Moreover, such a solution may also result in excessive signaling, as the timing of the different UL CCs (that do not share the same timing) will need to be adjusted regularly and independently, to avoid that any of the time-alignment timers expire prematurely or unnecessarily. Yet another difficulty with this solution is that multiple random access procedures, as initiated by the UE, may be required.

Accordingly, it would be desirable to provide methods, devices, systems and software that would avoid the afore-described problems and drawbacks.

SUMMARY

It is therefore an object to address some of the problems and disadvantages outlined above and to provide methods and arrangements for adjusting timing of transmissions in radio communication system in which aggregation of component carriers is applied.

The above stated object is achieved by means of methods and arrangements according to the independent claims, or the embodiments according to the dependent claims.

In accordance with a first aspect of embodiments, a method in a base station for adjusting timing of transmissions in a radio communication system is provided. Aggregation of component carriers is employed in the radio communication system. Moreover, the base station is configured to receive data from a user equipment over a plurality of uplink component carriers. The method comprising sending a first timing advance command to the user equipment, wherein the first timing advance command is applicable to transmissions on a first component carrier. If the base station detects a need to maintain different uplink transmission timing for the first component carrier and at least a second component carrier, it sends a second timing advance command to the user equipment. Furthermore, the second timing advance command is based on the detected need to maintain different uplink transmission timing and is applicable to uplink transmissions on at least one of the first component carrier and the second component carrier.

In accordance with a second aspect of embodiments, a method in a user equipment for adjusting timing of transmissions in a radio communication system is provided. Aggregation of component carriers is employed in the radio communication system. Furthermore, the user equipment is configured to transmit data to a base station comprised in the radio communication system over a plurality of uplink component carriers. The method comprising receiving a first timing advance command from the base station, wherein the first timing advance command is applicable to transmissions on a first component carrier. Then the user equipment receives a second timing advance command from the base station, wherein the second timing advance command is based on a detected need to maintain different uplink transmission timing for the first component carrier and at least a second component carrier. Moreover, the second timing advance command is applicable to transmissions on at least one of the first component carrier and the second uplink component carrier. Furthermore, the method comprising adjusting uplink transmissions on at least one of the first component carrier and the second uplink component carrier based on the second timing advance command.

In accordance with a third aspect of embodiments, a base station for adjusting timing of transmissions in a radio communication system is provided. Aggregation of component carriers is employed in the radio communication system. The base station is configured to receive data from a user equipment over a plurality of uplink component carriers. The base station comprises a transmitter unit adapted to send a first timing advance command to the user equipment, wherein the first timing advance command is applicable to transmissions on a first component carrier. It further comprises a detecting unit adapted to detect a need to maintain different uplink transmission timing for the first component carrier and at least a second component carrier. Additionally, the transmitter unit is further adapted to send a second timing advance command to the user equipment, wherein the second timing advance command is based on the detected need to maintain different uplink transmission timing. Moreover, the second timing advance command is applicable to uplink transmissions on at least one of the first component carrier and the second component carrier.

In accordance with a fourth aspect of embodiments, a user equipment for adjusting timing of transmissions in a radio communication system is provided. Aggregation of component carriers is employed in the radio communication system. The user equipment is configured to transmit data to a base station comprised in the radio communication system over a plurality of uplink component carriers. The user equipment comprises a receiver unit adapted to receive a first timing advance command from the base station, wherein the first timing advance command is applicable to transmissions on a first component carrier. Moreover, the receiver unit is further adapted to receive a second timing advance command from the base station, wherein the second timing advance command is based on a detected need to maintain different uplink transmission timing for the first component carrier and at least a second component carrier. The second timing advance command is applicable to transmissions on at least one of the first component carrier and the second uplink component carrier. The user equipment further comprises an adjustment unit adapted to adjust uplink transmissions on at least one of the first component carrier and the second uplink component carrier based on the second timing advance command.

An advantage with described embodiments is that only a single time alignment timer is necessary in a user equipment even in deployments with different propagation delays on UL component carriers used by the user equipment.

Another advantage with described embodiments is that it is not required that the UE performs multiple random access procedures in parallel or subsequently in order to gain synchronization of multiple uplink component carriers.

Yet another advantage with described embodiments is that they allow keeping uplink component carriers synchronized without requiring regular TA commands per uplink component carrier nor regular uplink transmissions on all uplink component carriers.

Further advantages and features of embodiments of the present invention will become apparent when reading the following detailed description in conjunction with the drawings.

BRIEF DESCRIPTION OF THE DRAWINGS

The present invention will be described in more detail below, and with reference to the accompanying figure, of which:

FIG. 1 shows an example of carrier aggregation, wherein the component carriers are aggregated contiguously.

FIG. 2 shows another example of carrier aggregation wherein the component carriers are aggregated non-contiguously.

FIG. 8 shows a regular TA command according to previous releases of the LTE standard.

FIG. 9 shows a relative TA command according to embodiments of the present invention.

FIG. 10 is a flow diagram illustrating a method in the network or the eNodeB for adjusting timing of transmissions according to an embodiment of the present invention.

FIG. 11 is a flow diagram illustrating a method in a user equipment for adjusting timing of transmissions according to an embodiment of the present invention.

FIG. 12 is a flow diagram illustrating a method in a base station for adjusting timing of transmissions according to an embodiment of the present invention.

FIG. 13 is a flow diagram illustrating a method in a user equipment for adjusting timing of transmissions according to an embodiment of the present invention.

DETAILED DESCRIPTION

Figure 3:
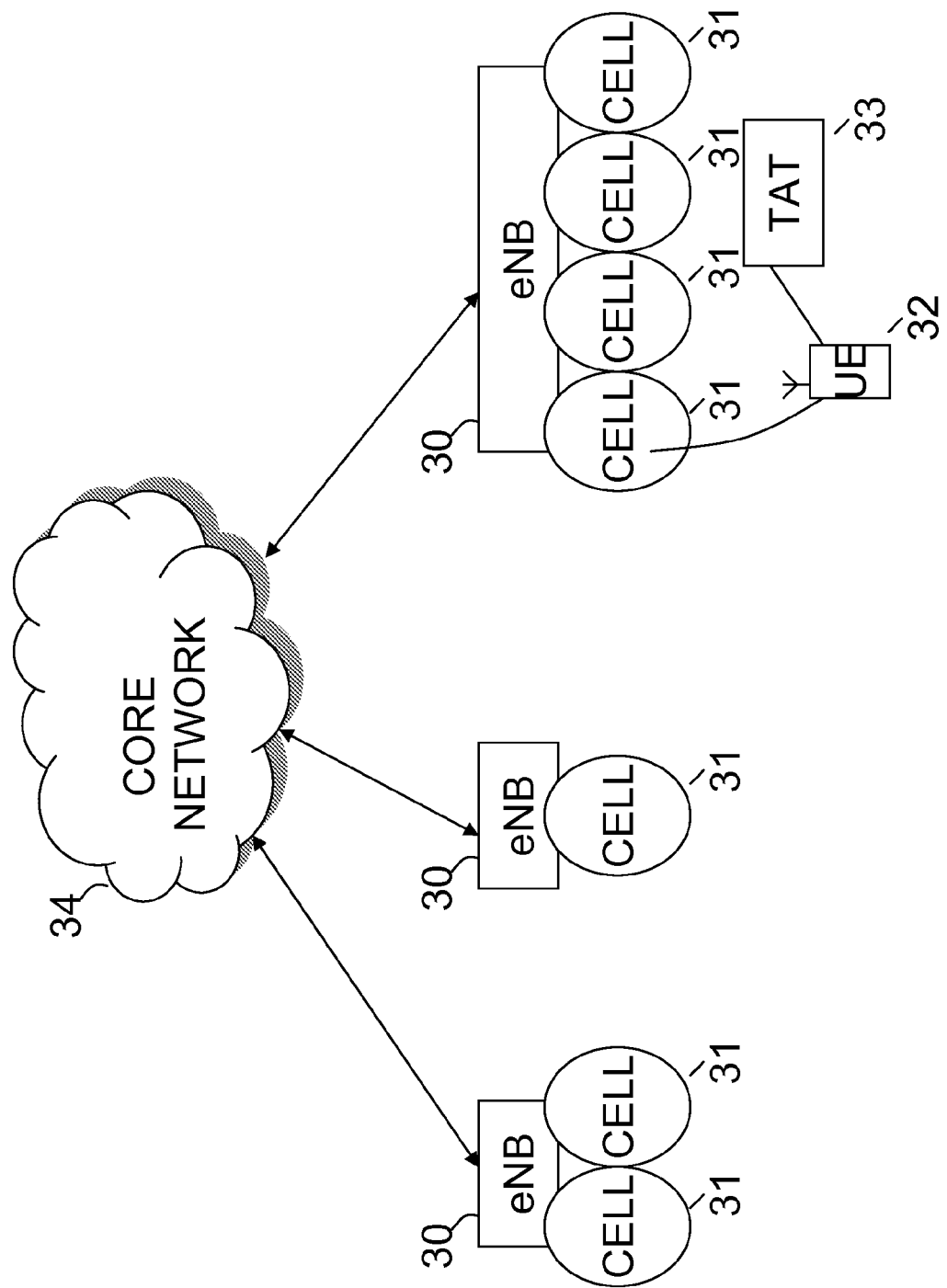
FIG. 3 illustrates an exemplary radio communication system in which embodiments of the present invention may be implemented.

In the following, the invention will be described in more detail with reference to certain embodiments and to an accompanying drawing. For the purpose of explanation and not limitation, specific details are set forth, such as particular scenarios, techniques, etc., in order to provide a thorough understanding of the present invention. However, it is apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

According to exemplary embodiments, a user equipment (UE) maintains only a single time alignment timer (TAT), even when operating in systems, e.g., in LTE systems, which employ carrier aggregation as described above. This means that, according to such exemplary embodiments, the UE performs a single random access procedure to obtain time synchronization, at which the UE starts the TAT when receiving a TA command. According to such exemplary embodiments, the network, e.g., the eNodeB, decides whether it considers the TA command, i.e. the uplink timing advance (UL TA), to be accurate enough also for the other uplink component carrier or carriers (UL CC) which that UE may be using.

For example, in one exemplary embodiment, the eNodeB detects that one or several UL CCs are received with offsets, and determines that separate time-alignment is required for the one or several UL CCs. The eNodeB may detect this need by detecting that received data on multiple UL CCs are received with offset, i.e. offset relative uplink transmissions on the already time synchronized component carrier. Alternatively, the eNodeB may issue an order to perform a Random Access on at least a second UL CC that may not share the UL timing of a first CC, and the need for timing-adjustment on the at least second UL CC is detected based on the Random Access attempt. If the eNodeB detects, e.g., based on the ordered random access or based on the actual uplink transmission, that the timing among the uplink CCs differs, it can send a second TA command, e.g., a relative or a carrier specific TA command. The relative TA command adjusts the timing advance by a delta in relation to another timing advance value. The carrier specific TA command adjusts the timing advance of a specific carrier.

According to another exemplary embodiment, e.g., from the perspective of the UE, upon reception of the relative or carrier specific TA command the UE adjusts the timing of this particular UL CC only. There may be a group of UL CCs that share the same timing, in which case the UE adjusts the timing of multiple CCs based on the relative or carrier specific TA command. For example, a TA control frame received by the UE according to exemplary embodiments may include multiple adjustment commands related to multiple groups of UL component carriers, where each group includes at least one UL component carrier.

According to one exemplary embodiment, the multiple adjustment commands provide relative adjustments in relation to a previous timing related to that group of UL CCs. According to another embodiment, the multiple adjustment commands include relative adjustments in relation to one specific UL CC or group of UL CCs, i.e. such that one UL group of component carriers maintains a reference timing, and the other groups of UL CCs are adjusted in relation to the timing of the UL group with the reference timing. A group of component carriers according to exemplary embodiments is characterized by the fact that all component carriers in that group share common uplink timing. Upon reception of consecutive regular TA commands the UE adjusts the timing of all UL CCs but maintains the relative offset as indicated before, i.e. maintains the relation to the timing of the UL group with the reference timing. A relative TA command may also be used to re-align the UL CCs, so that there is no longer a relative timing offset. Thus according to exemplary embodiments, two different types of TA commands may be sent and received, e.g., relative or carrier specific TA commands which impact a single UL CC transmission (or a group of UL CC transmissions that share common timing) and "regular" or global TA commands which impact all of the UL CCs associated with a particular UE. The regular TA command adjusts the timing advance of all component carriers with an equal amount i.e. it maintains the relative timing between different CCs.

To provide some context for the more detailed description of timing alignment according to these exemplary embodiments, consider first the exemplary radio communication system illustrated in FIG. 3. Beginning with the radio access network nodes and interfaces in the figure, it will be seen that this particular example is provided in the context of LTE systems. Nonetheless, the present invention is not limited in its applicability to LTE systems and can instead be used in any system wherein carrier aggregation is employed or in which plural timing alignments per UE may be desirable. Since, however, the example in FIG. 3 is provided in terms of LTE, the network node 30 which transmits and receives over the air interface is termed an eNodeB, several of which eNodeBs 30 are illustrated therein.

In the context of the air interface, each eNodeB 30 is responsible for transmitting signals toward, and receiving signals from, one or more cells 31. Each eNodeB 30 according to this exemplary embodiment includes multiple antennas, e.g., 2, 4, or more transmit antennas, as well as potentially multiple receive antennas, e.g., 2, 4, or more receive antennas, and handles functions including, but not limited to coding, decoding, modulation, demodulation, interleaving, de-interleaving, etc., with respect to the physical layer of such signals. Note that, as used herein, the phrase "transmit antennas" is specifically meant to include, and be generic to, physical antennas, virtual antennas and antenna ports. The eNodeBs 30 are also responsible for many higher functions associated with handling communications in the system including, for example, scheduling users, handover decisions, and the like.

According to exemplary embodiments, a UE 32 which is operating in a cell 31 as shown in FIG. 3 will transmit and/or receive signals using an aggregated carrier, e.g., as shown in FIG. 1 or 2. Similarly, an eNodeB 30 will transmit and/or receive signals using an aggregated carrier, e.g., as shown in FIG. 1 or 2. The UE 32 maintains a single timing alignment timer (TAT) 33 according to this exemplary embodiment, based upon which its timing alignment issues are managed.

For this discussion of timing alignment handling according to this exemplary embodiment, assume that the UE 32 is in the RRC CONNECTED state, but that the UE 32 has not been involved in any UL transmission for a while. Thus, assume that the TAT 33 has expired. The UE 32 now performs a random access procedure, e.g., according to the specification of present LTE release, prior to any data transmission if the TAT 33 is not running in order to facilitate transmission in the uplink. The random access procedure may be ordered by the core network 34 or the eNodeB 30, or it may be initiated autonomously by the UE 32, e.g., in case the UE 32 detects that it has data to send. Based on the random access message, the eNodeB 30 determines a suitable TA value and provides that value to the UE 32. The UE 32 adjusts its uplink timing, e.g., as described in 3GPP TS 36.213, "Physical layer procedures", Rel-8/9 at Section 4.3.2, of the UL CC on which it performed the random access. The UE 32 starts the TAT 33 and may be considered to be uplink time aligned.

According to exemplary embodiments, and if the UE 32 has multiple UL CCs configured, the UE 32 may now assume that all of its UL CCs are time-aligned, unlike the aforedescribed timing alignment solution wherein it is assumed that each group of CCs with different timing must separately be synchronized by the UE, i.e., by using a random access procedure on each of the UL CCs or CC groups. As will be apparent from the description below, and according to these exemplary embodiments, the UE 32 may store relative offsets of the groups of CCs that have different time-alignment, and apply the offsets to the groups of UL CCs as soon as at least one UL CC has been synchronized, and the TAT 33 has been started.

According to this exemplary embodiment, the eNodeB 30 evaluates whether the existing or current timing advance is also suitable to use in coordinating transmission for the other UL CCs. If so, it may provide UL grants for those UL CCs and the UE 32 applies (or is ordered to apply) the present timing advance. In the special case when no offsets between the UL carriers have been assigned, then the UL CCs are transmitted without any relative offset from the UE 32. If offsets have been assigned, as will be described further below, then the UL carriers will be transmitted according to exemplary embodiments with relative offsets.

Figure 4:
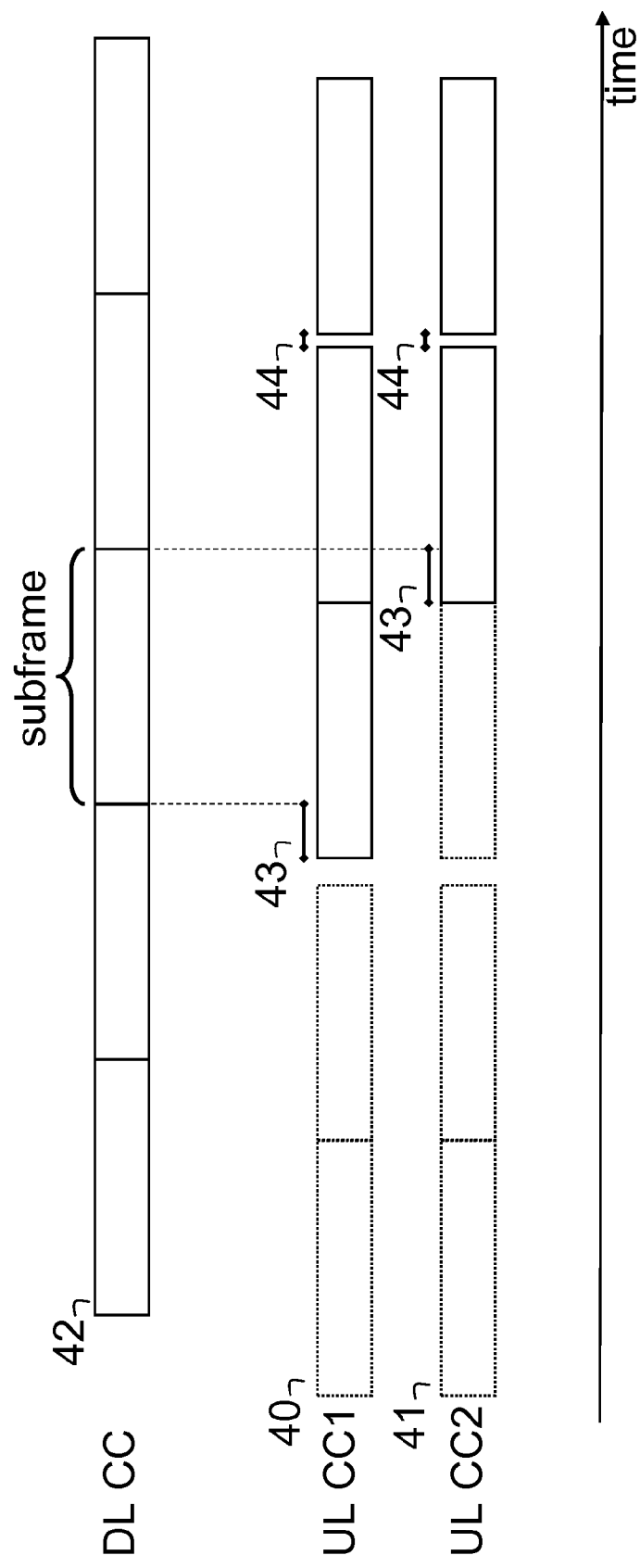
FIG. 4 illustrates a DL component carrier and two UL component carriers between which no offset occurs.

FIG. 4 illustrates the situation where no offset occurs between two UL CCs which are being used by the same UE 32 to transmit uplink data, i.e. the two UL CCs, UL CC1 denoted 40 and UL CC2 denoted 41, share the same timing. In this Figure, for which the horizontal axis represents time and each rectangle represents a subframe of data being transmitted over time, it can be seen that two UL CCs 40 and 41 are transmitted by the UE 32 at the same time relative to a received, downlink CC 42. As seen, the TA value is transmitted to the UE 32 in the DL CC 42, which uses that value to start 43 the transmission of a subsequent uplink subframe for both UL CC1 40 and UL CC2 41. Later, a regular TA command update is received by the UE 32, which modifies 44 the timing for both UL CC1 40 and UL CC2 41.

In order to cope with different propagation delays on the UL CCs used by the UE 32, exemplary embodiments employ the following technique. If the eNodeB 30 detects a timing offset among the uplink signals received from a UE 32 on different uplink CCs, the eNodeB 30 (or another node in the core network 34) determines a relative TA command. The eNodeB 30 provides this relative TA command to the UE 32 where the message comprises one or more carrier indicators (e.g. in the MAC CE). Accordingly, the UE 32 adjusts the timing of those UL CCs or groups of UL CCs associated with the carrier indicators while maintaining the same timing for the other UL CCs. From then on, the UE 32 maintains a relative offset among its UL CCs. The relative TA command can, for example, be sent as a new, separate signal relative to the "regular", global TA command or it can be sent as part of the "regular", global TA command, e.g., as a separate field in the TA command.

In one exemplary embodiment, any consecutive (non-relative) regular TA command is applied to all UL CCs so that the relative offset (if any) between the UL CCs is preserved, as established by the preceding relative TA command. As before, the UE 32 is expected to re-start its TAT 33 upon reception of at least any non-relative TA command. Alternatively, the UE 32 may restart its TAT 33 upon reception of any TA command. Accordingly, in another embodiment the UE 32 could also restart the TAT 33 upon reception of a relative TA command.

Figure 5:
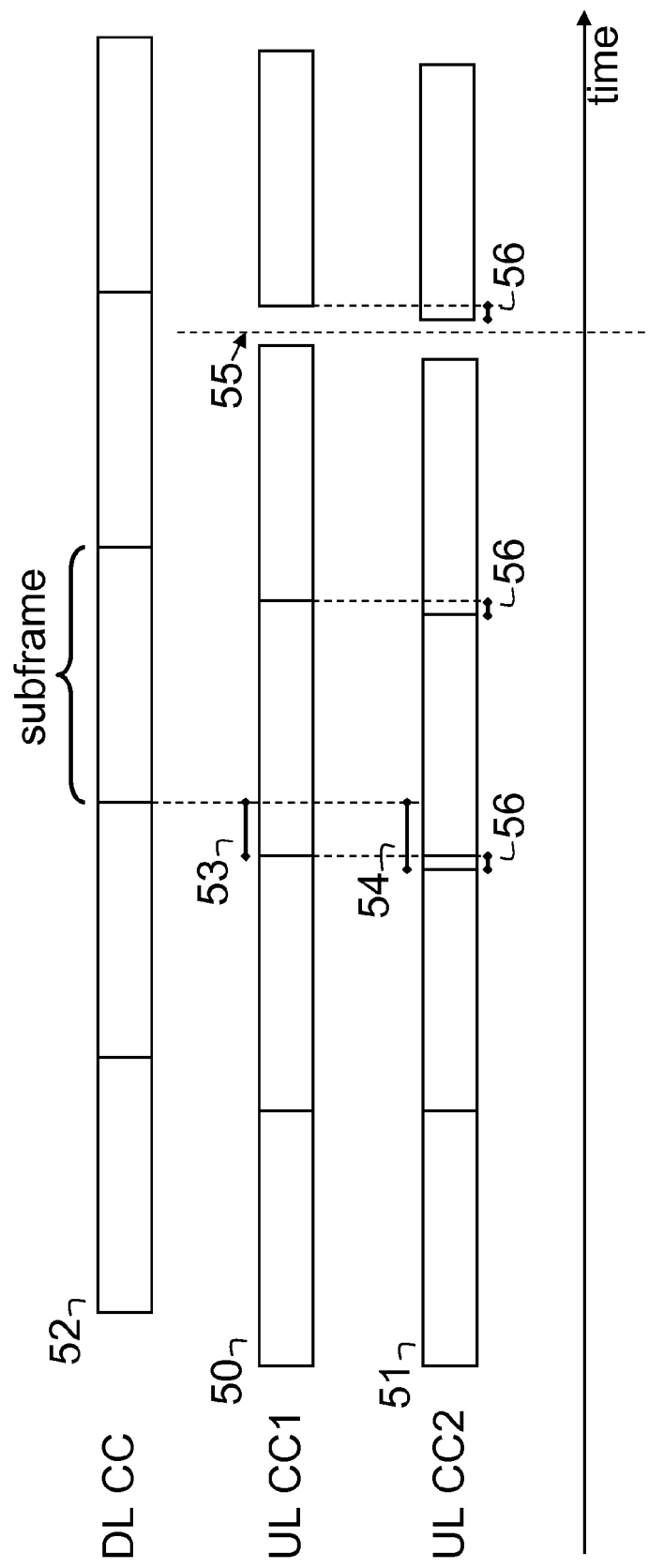
FIG. 5 illustrates a DL component carrier and two UL component carriers between which a constant offset occurs.

FIG. 5 illustrates the situation where a relative offset is provided between two UL CCs, UL CC1 50 and UL CC2 51, which are being used by the same UE 32 to transmit uplink data, i.e. the two UL CCs have different timing. In this Figure, for which the horizontal axis represents time and each rectangle represents a subframe of data being transmitted over time, it can be seen that two UL CCs 50 and 51 are transmitted by the UE 32 at different times 53, 54 relative to a received, downlink CC 52. Additionally, when a regular TA command is subsequently received and applied 55, the same relative offset 56 between transmissions on UL CC1 50 and UL CC2 51 is employed (until, e.g., another relative TA command is received).

If the eNodeB 30 does not expect other UL CCs to be reasonably time aligned with the UL CC for which the UE 32 performed a random access, then the eNodeB 30 may decide to explicitly order a random access on another UL CC, e.g., using a so-called "PDCCH order" which is defined for LTE Rel-8/9 in 3GPP TS 36.321, "MAC specification", Rel-8/9. According to this exemplary embodiment, the eNodeB 30 may now issue a random access on a specific UL CC by a PDCCH order, and in response to the random access, the eNodeB 30 issues a relative or absolute TA command to the UE 32. Thus, by means of this exemplary embodiment, the UE 32 can now maintain time-alignment of multiple UL CCs, where the UE 32 maintains the relative timing between multiple UL carriers in the form of offsets.

As mentioned above, as for a UE 32 initiated random access, the eNodeB 30 determines a suitable TA command based on the random access transmission and may, if necessary, provide a suitable relative TA value. If the eNodeB 30 detects that the UL CCs are actually time aligned it may either provide a relative TA value indicating this (offset=0) or it could send a normal (non relative) TA command to update the overall time alignment of the UE 32. To better illustrate methods of performing timing alignment according to exemplary embodiments, FIG. 6 depicts a method of performing timing alignment according to an exemplary embodiment from the UE 32 perspective and FIG. 7 depicts a method of performing timing alignment from the base station, network 34 or eNodeB 30 perspective.

Figure 6:
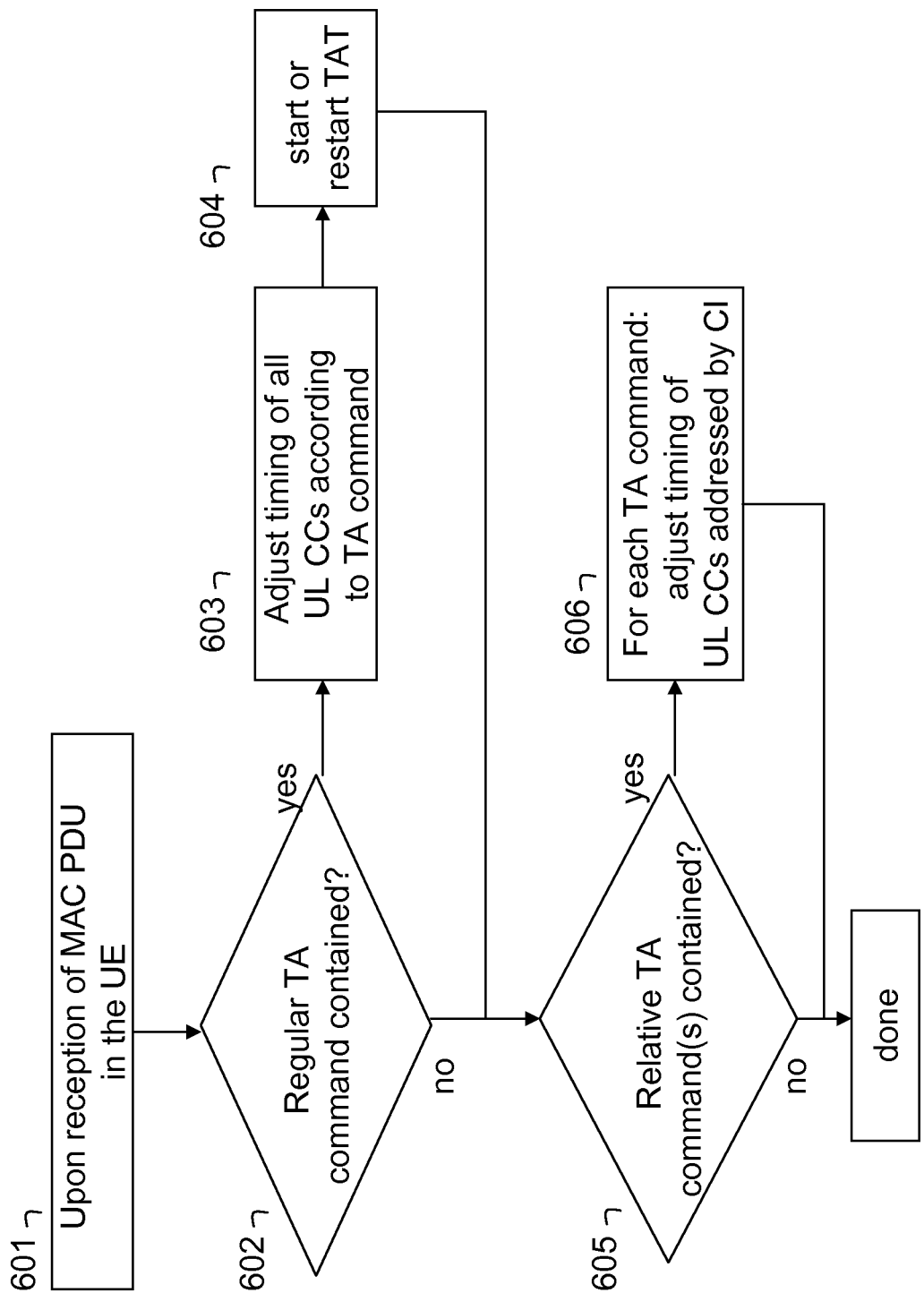
FIG. 6 is a flow diagram illustrating a method for adjusting timing of transmissions according to an embodiment of the present invention.

In accordance with FIG. 6, in a first step 601 the UE 32 receives a first TA command, wherein the TA command may be comprised in a MAC PDU. In a next step 602 the UE 32 determines if the TA command is a regular TA command. If it is a regular TA command the UE 32 adjusts timing of all UL CCs according to the regular TA command in a step 603 and starts or restarts the TAT 33 at step 604. However, if the TA command is not a regular TA command the UE 32 determines in a step 605 if the TA command is a relative TA command. If it is a relative TA command the UE 32 adjusts in step 606 the timing of the UL CCs which are addressed in the TA command e.g. in a carrier identifier field (CI).

Figure 7:
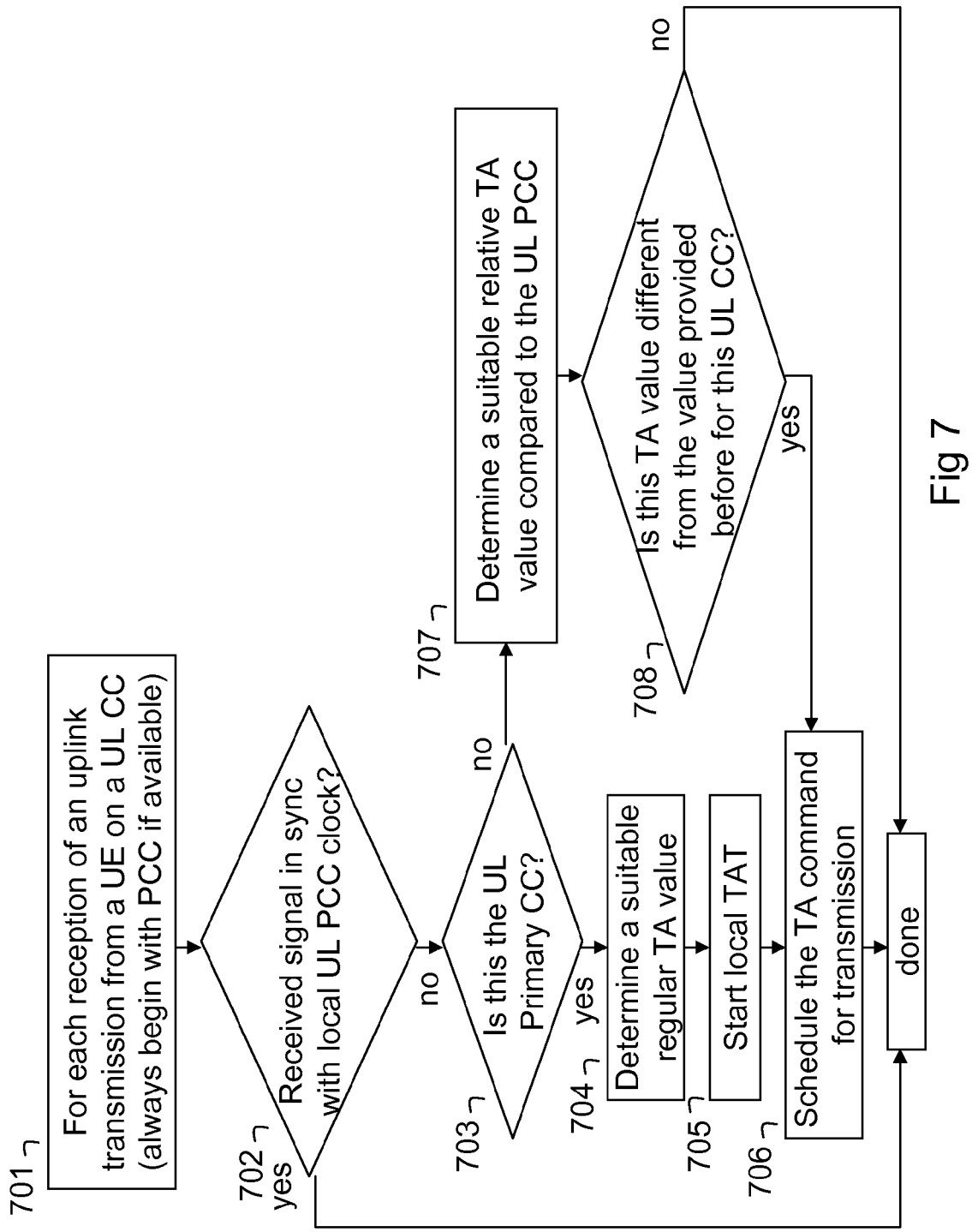
FIG. 7 is a flow diagram illustrating a method for adjusting timing of transmissions according to another embodiment of the present invention.

In accordance with FIG. 7, in a first step 701 the eNodeB 30 receives an uplink transmission from the UE 32 on an UL CC. In a next step 702 the eNodeB 30 determines whether the received signal is synchronized with the local uplink Primary Component Carrier (PCC) clock. If it is not synchronized, it is determined 703 if the UL CC upon which the transmission is received is the reference (or primary) UL CC. If it is the reference UL CC a suitable regular TA command is determined in a step 704. The TAT 33 is then started in step 705 and the eNodeB 30 schedules the TA command for transmission and sends it to the UE 32 in step 706. However, if the eNodeB 30 determines in step 703 that the UL CC upon which the transmission is received is not the reference (or primary) UL CC but another UP CC, the eNodeB 30 determines in step 707 a suitable relative TA command such that the UE 32 may adjust the timing advance by a delta in relation to the reference timing advance. However, in order to avoid unnecessary signaling of TA commands the eNodeB may in a step 708 check if the relative TA value determined in step 707 is identical to a previous sent TA value applicable for the UL CC. If it is different the eNodeB 30 schedules the TA command for transmission and sends it to the UE 32 in step 706. Otherwise, the relative TA value is not sent to the UE 32.

The foregoing primarily focuses on timing alignment associated with uplink transmissions in systems using aggregated carriers, however it will be appreciated that not only the uplink CCs but also the downlink CCs may have different propagation delays. According to exemplary embodiments, it may be necessary to specify a linking between UL and DL carriers in order to unambiguously apply TA commands provided by the eNodeB 30. With the exemplary techniques described above, an implicit linking is used when applying an initial non-relative TA command received in response to a random access procedure. According to an exemplary embodiment, the non-relative TA value received in response to a random access is interpreted in relation to the frame timing of the DL CC on which the TA command was received. This applies to both a UE initiated random access and a PDCCH order for a secondary UL CC. As explained above, the UE 32 shall adjust all UL CCs based on a non-relative TA command.

The aforementioned TA commands described in the exemplary embodiments above can be implemented in a Medium Access Control protocol, where the command is characterized by fields including at least a carrier or carrier group identifier field and a time-alignment field. In certain embodiments, multiple such identifier fields and time-alignment fields may be present in the command. If a command with multiple such fields is received by a UE 32, the UE 32 adjusts the relative and absolute offsets of its multiple UL CCs accordingly. In one embodiment, relative TA commands are distinguished from regular (non-relative) TA commands by using a different LCID in the MAC Sub-Header. The regular TA command according to previous releases of the LTE standard is depicted in FIG. 8. Examples of a relative TA command including a carrier indicator are shown in FIG. 9.

In one exemplary embodiment, multiple relative TA commands for multiple UL CCs can be provided by multiplexing multiple MAC Control Elements as depicted in FIG. 9 into a single MAC PDU, e.g., using the MAC protocol according to previous releases of the LTE standard. The time-alignment field or fields may either describe an absolute adjustment, or the field or fields may describe a relative adjustment (offset) in relation to another carrier.

To better understand time alignment according to these exemplary embodiments, consider the following illustrative, non-exclusive example.
1. A UE 32 is assumed to have two UL CCs. The time-alignment timer 33 is not running. There is no relative offset between the component carriers.
2. The UE 32 issues a RA on the first UL CC (UL1) and receives a time alignment (e.g., as in FIG. 8) in response, and adjusts the timing of both UL CCs accordingly, without any offsets between the UL CCs. TAT 33 is started.
3. The UE 32 receives a relative time-alignment command (e.g. as depicted in FIG. 9) related to UL2: "+1" time unit in relation to UL1. The UE 32 adjusts the timing of UL2 in relation to the current timing of UL2 (and UL1) accordingly. TAT 33 is started. The command may have been issued in response to a PDCCH order on UL2, or it may have been issued without any such order.

4. TAT 33 expires and consequently the UE 32 is considered unsynchronized. Still, the UE 32 may maintain the relative offsets between UL1 and UL2.
5. The UE 32 issues a random access, e.g. due to UL data in its buffers. Upon reception and application of a regular time-alignment command, the UE 32 now considers all its ULs to be synchronized again, even if the random access is issued on only one of the uplinks. The UE 32 maintains the relative offset (+1) between the carriers. For example, the UE 32 may have issued the RA on UL2, in which case the relative offset of UL1 is "−1" relative to UL2.
6. The UE 32 may now receive additional relative adjustments (e.g. as depicted in FIG. 9), e.g. such that UL1 is adjusted with "−1", in which case the relative offset between UL1 and UL2 will be 2 units.
7. The UE 32 considers all its ULs time-aligned as long as the single timer 33, that is maintained according to these exemplary embodiments, is running.

Thus it will be appreciated that, according to these exemplary embodiments, only a single time alignment timer is used even in deployments with different propagation delays on UL CCs. Furthermore, these embodiments do not require the UE to perform multiple random access procedures in parallel, or subsequently to gain synchronization of multiple UL carriers. Instead, it is left up to the network to request random access on other UL CCs and to provide, if needed, relative TA values for those. Furthermore, the exemplary embodiments enable synchronization of UL CCs without requiring regular TA commands per UL CC nor regular uplink transmission on all UL CCs.

According to an exemplary embodiment, a method for performing timing alignment from the perspective of the network or eNodeB can include the steps illustrated in the flowchart of FIG. 10. Therein, at step 1000, an uplink transmission is received from a UE on at least one CC. The network or eNodeB detects or determines a need to adjust the timing between uplink CCs for that UE at step 1002. The eNodeB then sends a TA command, e.g., a relative TA command, which includes a reference to one or multiple CCs to adjust the timing for those CCs at step 1004. This method could be condensed to include just steps 1000 and 1004.

Similarly, from the UE perspective, a method for performing timing alignment according to an exemplary embodiment can be described as shown in the flowchart of FIG. 11. Therein, at step 1100, a UE receives a downlink transmission including an absolute or relative TA command. The UE adjusts its uplink transmission according to the content of the command at step 1102. The UE starts the TA timer, e.g., subject to additional rules as described above, at step 1104. This method could be condensed to include just steps 1100 and 1102.

According to another exemplary embodiment, a method for performing timing alignment from the perspective of a base station can include the steps illustrated in the flowchart of FIG. 12. Therein, at step 1200, a first TA command is sent to a UE, wherein the first TA command is applicable to transmissions on a first CC. The base station detects a need to maintain different UL transmission timing for the first CC and at least a second CC for that UE at step 1202. If the base station detects a need to maintain different UL transmission timing it then sends a second TA command to the UE at step 1204. The second TA command is based on the detected need to maintain different UL transmission timing and is applicable to UL transmissions on the first CC and/or the second CC. Furthermore, in the method the step of detecting 1204 the need to maintain different UL transmission timing for the first and the second CC may be performed by detecting that UL transmissions on the second UL CC is received with an offset relative UL transmissions on the first CC. However, it may also be performed by ordering the UE to perform a random access on the second UL CC and detecting that UL transmissions on the second UL carrier is received with an offset relative UL transmissions on the first CC.

Similarly, from the UE perspective, a method for performing timing alignment according to an exemplary embodiment can be described as shown in the flowchart of FIG. 13. Therein, at step 1300, a UE receives a first TA command from the base station. The first TA command is applicable to transmissions on a first UL CC. Consequently, the uplink transmission on the first CC is adjusted based on the first TA command. When the first UL CC is adjusted the UE starts a TAT in a step 1302. At step 1304 the UE receives a second TA command from the base station. The second TA command is based on a detected need to maintain different UL transmission timing for the first CC and at least a second CC and is applicable to transmissions on the first CC and/or the second UL CC. The UE adjusts UL transmissions on the first CC and/or the second UL CC based on the second TA command at step 1306. The UE may start or restart the TAT after adjusting UL transmissions on the first CC and/or the second UL CC at step 1308. It may also be started only when the second TA command is applicable to the first CC ignoring adjustments of the second CC.

Further to the exemplary embodiments, the first TA command may comprise a reference timing advance or a timing adjustment applicable to transmissions on the first CC and the second TA command may comprise a timing advance or a timing adjustment based on the detected need to maintain different UL transmission timing and which is applicable to UL transmissions on the first CC and/or the second CC. Moreover, the second TA command may be based on the offset relative UL transmissions on the first CC. Moreover, the second TA command may be applicable to several of the plurality of UL CCs. The second TA command may also comprise multiple adjustment commands applicable to several of the plurality of UL CCs. Additionally, the multiple adjustment commands may provide relative time adjustments in relation to a previous TA command applied to at least one of the plurality of UL CCs. Further, the multiple adjustment commands may provide relative time adjustments in relation to the first TA command.

Figure 14:
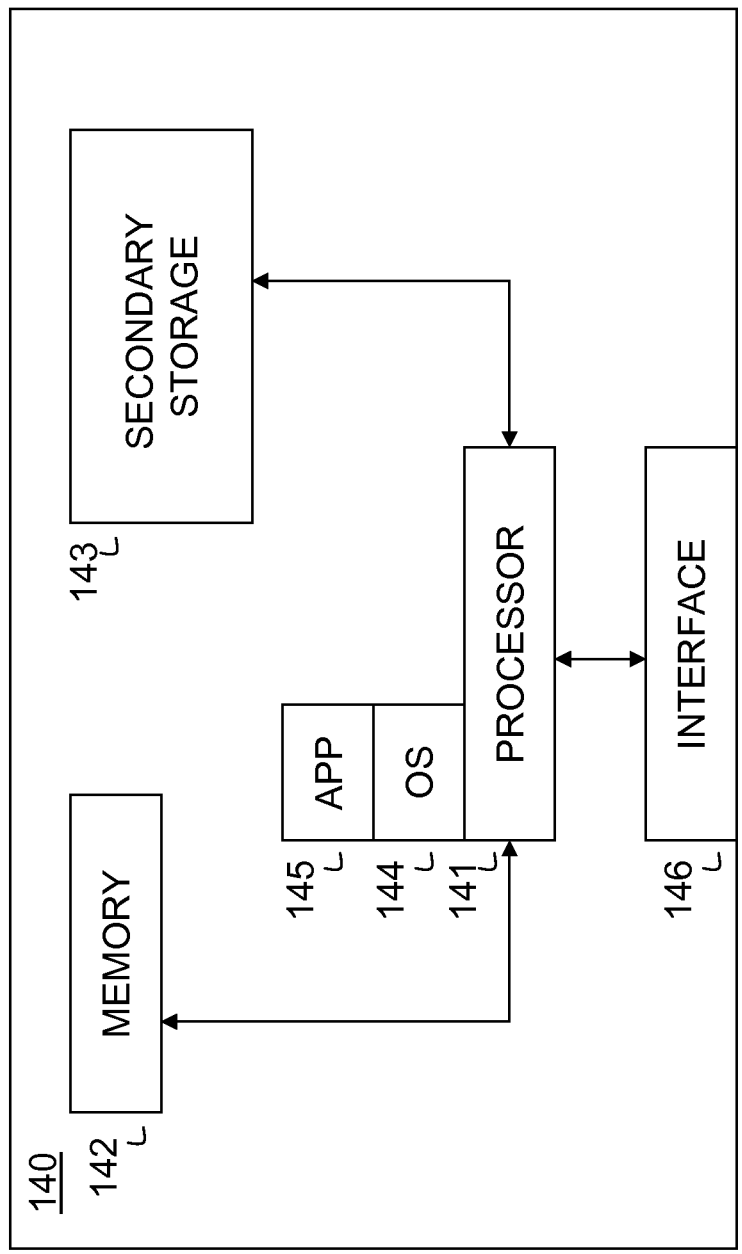
FIG. 14 is a schematic block diagram of a node in which embodiments of the present invention are applied to achieve time adjustment of transmissions.

The UE 32 and eNodeB 30 can, for example, be implemented using various components, both hardware and software. For example, as shown generally in FIG. 14, such a UE or eNodeB 140 can include a processor 141 (or multiple processor cores), memory 142, one or more secondary storage devices 143 (e.g., external storage device(s)), an operating system 144 running on the processor 141 and using the memory 142, as well as a corresponding application 145, e.g., an application which handles timing alignment in the manner described above. An interface unit 146 may be provided to facilitate communications between the node 140 and the rest of the network or may be integrated into the processor 141. For example, interface unit 146 can include a transceiver capable of communicating wirelessly over an air interface, e.g., as specified by LTE, including hardware and software capable of performing the necessary modulating, coding, filtering and the like, as well as demodulating and decoding to process such signals, including TA commands as described above.

Figure 15:
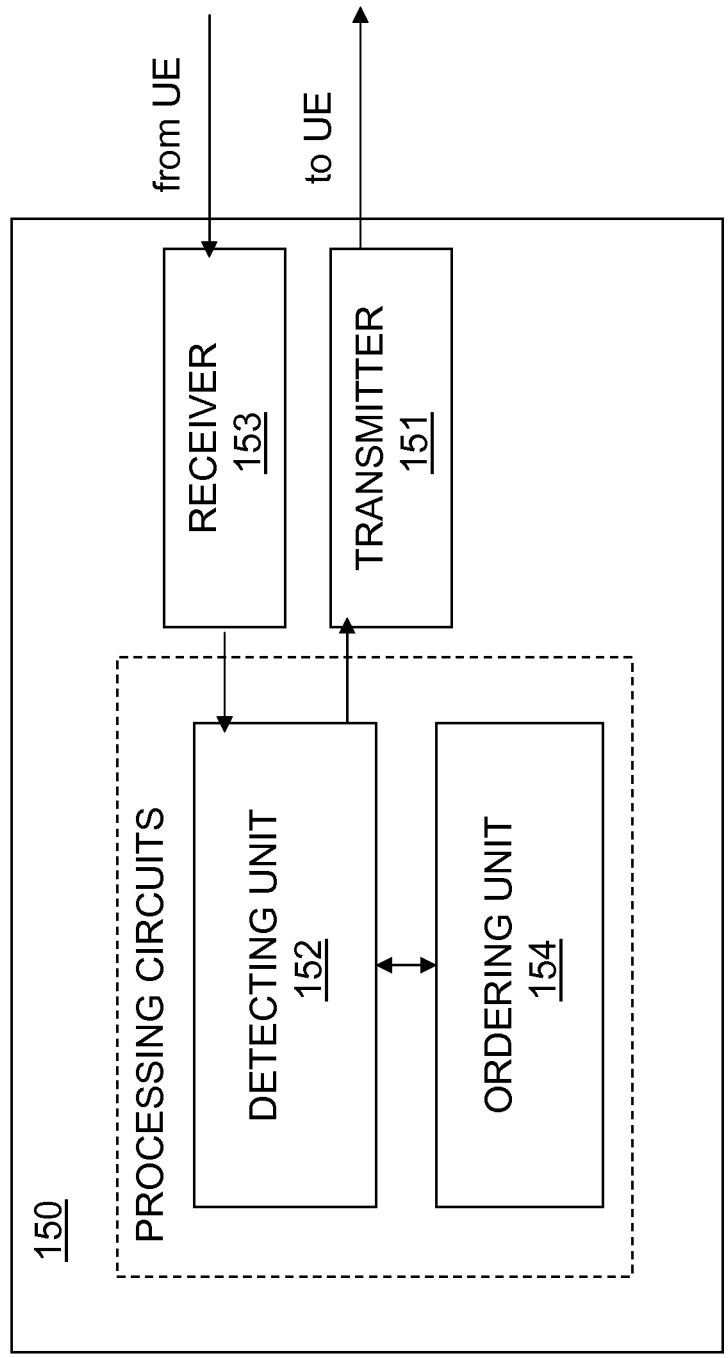
FIG. 15 is a schematic block diagram of a base station in which embodiments of the present invention are applied to achieve time adjustment of transmissions.

According to another exemplary embodiment, a base station for performing timing alignment may include the units illustrated in the schematic block diagram of FIG. 15. The base station 150 may comprise a transmitter unit 151 adapted to send a first TA command to the UE and a detecting unit 152 adapted to detect a need to maintain different UL transmission timing for a first CC and at least a second CC. The transmitter unit 151 may further be adapted to send a second TA command to the UE. The second TA command is then based on the detected need to maintain different UL transmission timing and is applicable to UL transmissions on the first CC and/or the second CC. In another exemplary embodiment, the base station further comprises a receiver unit 153 and an ordering unit 154 adapted to order the UE to perform a random access on the second UL CC. The detecting unit 152 is then further adapted to detect that uplink transmissions on the second uplink carrier is received with an offset relative uplink transmissions on the first component carrier.

Figure 16:
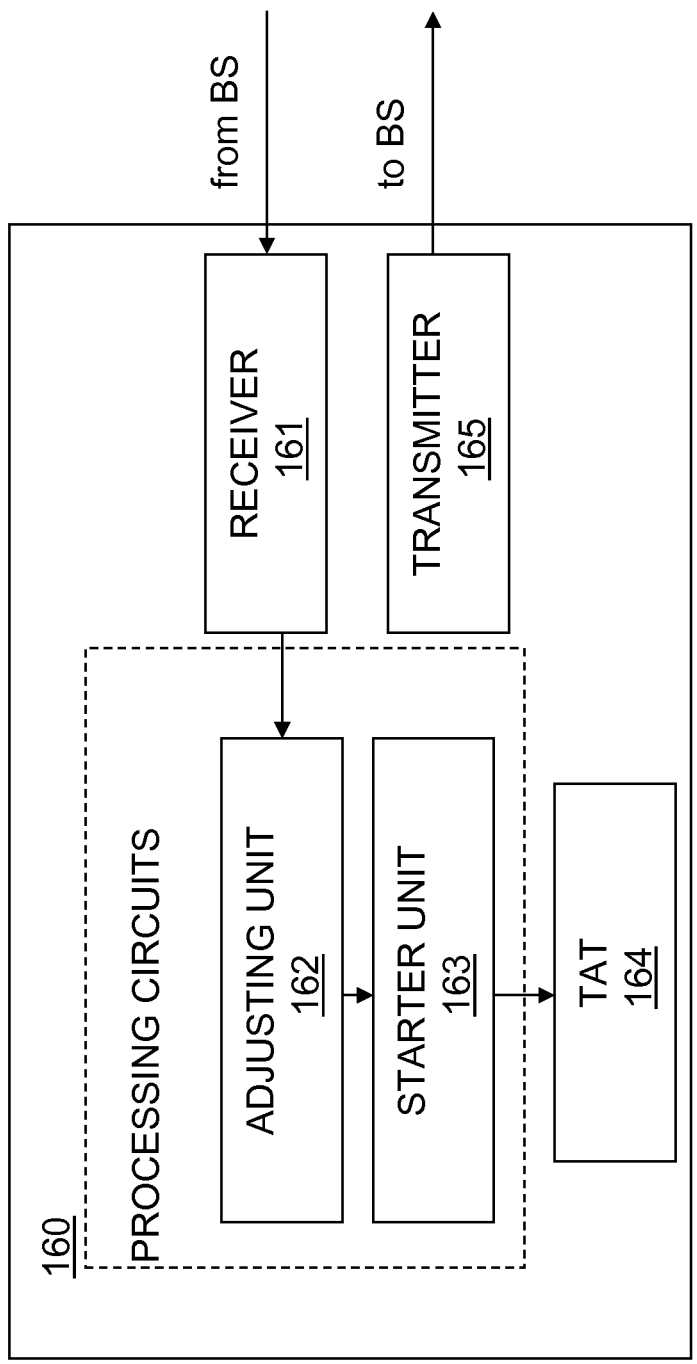
FIG. 16 is a schematic block diagram of a user equipment in which embodiments of the present invention are applied to achieve time adjustment of transmissions.

According to another exemplary embodiment, a UE for performing timing alignment may include the units illustrated in the schematic block diagram of FIG. 16. The UE 160 may comprise a receiver unit 161 adapted to receive a first TA command from the base station. The first TA command is applicable to transmissions on a first CC. The receiver unit may further be adapted to receive a second TA command based on a detected need to maintain different UL transmission timing for the first CC and at least a second CC. The second TA command is applicable to transmissions on the first CC and/or the second UL CC. The UE further comprises an adjustment unit 162 adapted to adjust UL transmissions on the first CC and/or the second UL CC based on the second TA command. The UE may also comprise a starter unit 163 adapted to start the time alignment timer 164 included in the UE 160. Additionally, the UE 160 may comprise a transmitter unit 165 for uplink transmissions to the base station.

A group of UL CCs could share the same time-alignment, while UL CCs from different groups would be controlled independently. For the present exemplary embodiments, it does not matter if timing is shared by some UL carriers, as the exemplary embodiments are equally applicable to "groups" of CCs with different timing requirements whether the "groups" comprise one or more CCs.

The present invention is not limited to the above-described preferred embodiments. Various alternatives, modifications and equivalents may be used. Therefore, the above embodiments should not be taken as limiting the scope of the invention, which is defined by the appending claims.

ABBREVIATIONS

CC=Component Carrier
CE=Control Element
CI=Carrier Identifier field
DL=Downlink—eNodeB to UE
eNB, eNodeB=LTE Base Station
Grant=LTE: Allocation of (uplink) transmission resources including coding and modulation scheme.
MAC=Medium Access Control
PCC clock=Primary Component Carrier clock
TA=Timing Advance—The time offset between downlink reception and uplink transmission at the terminal side.
TA Command=Message from the eNB to the UE instructing the UE to change the TA by shifting its UL transmission in time.
TAT=Time Alignment Timer—The UE regards itself as 'not-synchronized' if the timer expired
UE=User Equipment, Terminal
UL=Uplink—UE to eNodeB

The invention claimed is:

1. A method performed by a base station for adjusting timing of uplink transmissions in a radio communication system in which aggregation of component carriers is employed, the base station being configured to receive data from a user equipment, UE, over a plurality of uplink component carriers, the method comprising:
    sending a first timing advance command to the UE, wherein the first timing advance command is applicable to transmissions on a first component carrier;
    receiving uplink transmissions from the UE, on the uplink carrier components, wherein the UE transmits uplink transmissions on the first component carrier according to the first timing advance command, and uses predetermined timings relative to the uplink transmissions on the first component carrier, for the uplink transmissions on the uplink carrier components other than the first component carrier, respectively;
    detecting a need to adjust the predetermined timings based on the uplink transmissions received from the UE using the predetermined timings; and
    sending a second timing advance command to the UE based on the detected need,
    wherein the second timing advance command is applicable to uplink transmissions on at least one of the first component carrier or a second component carrier among the uplink carrier components, the second timing advance command specifying an offset of uplink transmissions on the second component carrier relative to uplink transmissions on the first component carrier.

2. The method according to claim 1, wherein the first timing advance command comprises:
    a reference timing advance or a timing adjustment.

3. The method according to claim 1, wherein the second timing advance command comprises:
    a timing advance or a timing adjustment based on the detected need.

4. The method according to claim 1, wherein detecting the need comprises:
    detecting that uplink transmissions on the second uplink carrier are received at the base station with an offset relative to receiving uplink transmissions on the first component carrier.

5. The method according to claim 1, wherein detecting the need comprises:
    ordering the UE to perform a random access on the second uplink component carrier and detecting if uplink transmissions on the at least a second uplink carrier are received with an offset relative to uplink transmissions on the first component carrier.

6. The method according to claim 1, wherein the second timing advance command is applicable to several of the plurality of uplink component carriers.

7. The method according to claim 1, wherein the second timing advance command comprises:
    multiple adjustment commands applicable to several of the plurality of uplink component carriers.

8. The method according to claim 7, wherein the multiple adjustment commands provide relative time adjustments in relation to a previous timing advance command applied to at least one of the plurality of uplink component carriers.

9. The method according to claim 7, wherein the multiple adjustment commands provide relative time adjustments in relation to the first timing advance command.

10. The method according to claim 1, wherein the timing advance command is implemented in a medium access control protocol.

11. The method according to claim 10, wherein the timing advance command comprises:

at least a carrier identifier field or carrier group identifier field and at least a time-alignment field.

12. The method according to claim 11, wherein the timing advance is included in the time-alignment field and a carrier indicator associated with the component carrier, to which the timing advance is applicable, is included in the carrier identifier field.

13. A method in a user equipment for adjusting timing of transmissions in a radio communication system in which aggregation of component carriers is employed, the user equipment being configured to transmit data to a base station comprised in the radio communication system over a plurality of uplink component carriers, the method comprising:
 receiving a first timing advance command from the base station, wherein the first timing advance command is applicable to transmissions on a first component carrier,
 sending uplink transmissions on the first component carrier according to the first timing advance command, and uplink transmissions on the uplink carrier components other than the first component carrier using predetermined timing offsets relative to the uplink transmissions on the first carrier, respectively;
 receiving a second timing advance command from the base station, wherein the second timing advance command is based on a need to adjust the predetermined timings, which need is detected based on the uplink transmissions sent on the carrier components using the predetermined timing offsets, the second timing advance command being applicable to transmissions on at least one of the first component carrier and a second uplink component carrier among the uplink component carriers; and
 adjusting timing for uplink transmissions on at least one of the first component carrier and the second uplink component carrier based on the second timing advance command,
 wherein the second timing advance command specifies an offset of uplink transmissions on the second uplink component carrier relative to uplink transmissions on the first component carrier.

14. The method according to claim 13, wherein the first timing advance command comprises:
 a reference timing advance or a timing adjustment.

15. The method according to claim 13, wherein the second timing advance command comprises:
 a timing advance or a timing adjustment based on the detected need.

16. The method according to claim 13, wherein the second timing advance command is applicable to several of the plurality of uplink component carriers.

17. The method according to claim 13, wherein the second timing advance command comprises:
 multiple adjustment commands applicable to several of the plurality of uplink component carriers.

18. The method according to claim 17, wherein the multiple adjustment commands provide relative time adjustments in relation to a previous timing advance command applied to at least one of the plurality of uplink component carriers.

19. The method according to claim 17, wherein the multiple adjustment commands provide relative time adjustments in relation to the first timing advance command.

20. The method according to claim 13, wherein the user equipment further includes a time alignment timer, the method further comprising:
 starting the time alignment timer.

21. The method according to claim 13, wherein the user equipment is configured with a time alignment timer, the method further comprising:
 starting the time alignment timer when the second timing advance command is applicable to the first component carrier.

22. The method according to claim 13, wherein the timing advance command is implemented in a medium access control protocol.

23. The method according to claim 22, wherein the timing advance command comprises:
 at least a carrier identifier field or carrier group identifier field and at least a time-alignment field.

24. The method according to claim 23, wherein the timing advance is included in the time-alignment field and a carrier indicator associated with the component carrier, to which the timing advance is applicable, is included in the carrier identifier field.

25. A base station for adjusting timing of transmissions in a radio communication system in which aggregation of component carriers is employed, the base station being configured to receive data from a user equipment, UE, over a plurality of uplink component carriers, the base station comprising:
 a transmitter unit configured to send a first timing advance command to the UE, wherein the first timing advance command is applicable to transmissions on a first component carrier;
 a receiver configured to receive uplink transmissions from the UE, on the uplink carrier components, wherein the UE transmits uplink transmissions on the first component carrier according to the first timing advance command, and uses predetermined timings relative to uplink transmissions on the first component carrier for the uplink transmissions on the uplink carrier components other than the first component carrier, respectively; and
 a detecting unit configured to detect a need to adjust timing of uplink transmissions based on the received uplink transmissions from the UE using the predetermined timings, and
 wherein the transmitter unit is further configured to send a second timing advance command to the UE, wherein the second timing advance command is based on the detected need, and
 wherein the second timing advance command specifies an offset of uplink transmissions on a second component carrier relative to uplink transmissions on the first component carrier.

26. The base station according to claim 25, wherein the first timing advance command comprises:
 a reference timing advance or a timing adjustment.

27. The base station according to claim 25, wherein the second timing advance command comprises:
 a timing advance or a timing adjustment based on the detected need.

28. The base station according to claim 25, wherein the detecting unit is further adapted to detect that uplink transmissions on the second uplink carrier are received with an offset relative to uplink transmissions on the first component carrier.

29. The base station according to claim 25, wherein the base station further comprises:
 an ordering unit adapted to order the UE to perform a random access on the second uplink component carrier, and
 wherein the detecting unit is further adapted to detect that uplink transmissions on the second uplink carrier are received with an offset relative uplink transmissions on the first component carrier.

30. The base station according to claim 25, wherein the second timing advance command is applicable to several of the plurality of uplink component carriers.

31. The base station according to claim 25, wherein the second timing advance command comprises:
multiple adjustment commands applicable to several of the plurality of uplink component carriers.

32. The base station according to claim 31, wherein the multiple adjustment commands provide relative time adjustments in relation to a previous timing advance command applied to at least one of the plurality of uplink component carriers.

33. The base station according to claim 31, wherein the multiple adjustment commands provide relative time adjustments in relation to the first timing advance command.

34. The base station according to claim 25, wherein the timing advance command is implemented in a medium access control protocol.

35. The base station according to claim 34, wherein the timing advance command comprises:
at least a carrier identifier field or carrier group identifier field and at least a time-alignment field.

36. The base station according to claim 35, wherein the timing advance is included in the time-alignment field and a carrier indicator associated with the component carrier, to which the timing advance is applicable, is included in the carrier identifier field.

37. A user equipment for adjusting timing of transmissions in a radio communication system in which aggregation of component carriers is employed, the user equipment being configured to transmit data to a base station in the radio communication system over a plurality of uplink component carriers, the user equipment comprising:
a receiver unit configured to receive a first timing advance command from the base station, wherein the first timing advance command is applicable to transmissions on a first component carrier,
a transmission unit configured to send uplink transmissions from the UE transmitting uplink transmissions on the first component carrier according to the first timing advance command, and using predetermined timings relative to the uplink transmissions on the first component carrier for the uplink transmissions on the carrier components other than the first component carrier, respectively,
wherein the receiver unit is further configured to receive a second timing advance command from the base station, wherein the second timing advance command is based on a detected need to adjust the predetermined timings based on the uplink transmissions received from the UE using the predetermined timings,
wherein the second timing advance command is applicable to transmissions on at least one of the first component carrier and a second component carrier among the components carriers and specifies an offset of uplink transmissions on the second component carrier relative to uplink transmissions on the first component carrier; and
an adjustment unit adapted to adjust uplink transmissions on at least one of the first component carrier and the second component carrier based on the second timing advance command.

38. The user equipment according to claim 37, wherein the first timing advance command comprises:
a reference timing advance and the reference timing advance is a timing advance or a timing adjustment.

39. The user equipment according to claim 37, wherein the second timing advance command comprises:
a timing advance or a timing adjustment based on the detected need.

40. The user equipment according to claim 37, wherein the second timing advance command is applicable to several of the plurality of uplink component carriers.

41. The user equipment according to claim 37, wherein the second timing advance command comprises:
multiple adjustment commands applicable to several of the plurality of uplink component carriers.

42. The user equipment according to claim 41, wherein the multiple adjustment commands provide relative time adjustments in relation to a previous timing advance command applied to at least one of the plurality of uplink component carriers.

43. The user equipment according to claim 41, wherein the multiple adjustment commands provide relative time adjustments in relation to the first timing advance command.

44. The user equipment according to claim 37, wherein the user equipment further comprises:
a time alignment timer; and
a starter unit adapted to start the time alignment timer.

45. The user equipment according to claim 37, wherein the user equipment is configured with a time alignment timer, the user equipment further comprising:
a starter unit adapted to start the time alignment timer when the second timing advance command is applicable to the first component carrier.

46. The user equipment according to claim 37, wherein the timing advance command is implemented in a medium access control protocol.

47. The user equipment according to claim 46, wherein the timing advance command comprises:
at least a carrier identifier field or carrier group identifier field and at least a time-alignment field.

48. The user equipment according to claim 47, wherein the timing advance is included in the time-alignment field and a carrier indicator associated with the component carrier, to which the timing advance is applicable, is included in the carrier identifier field.

* * * * *